No. 612,460. Patented Oct. 18, 1898.
C. R. REID.
COMBINED CULTIVATOR, PLANTER, AND FERTILIZER DISTRIBUTER.
(Application filed May 26, 1898.)
(No Model.) 3 Sheets—Sheet 1.
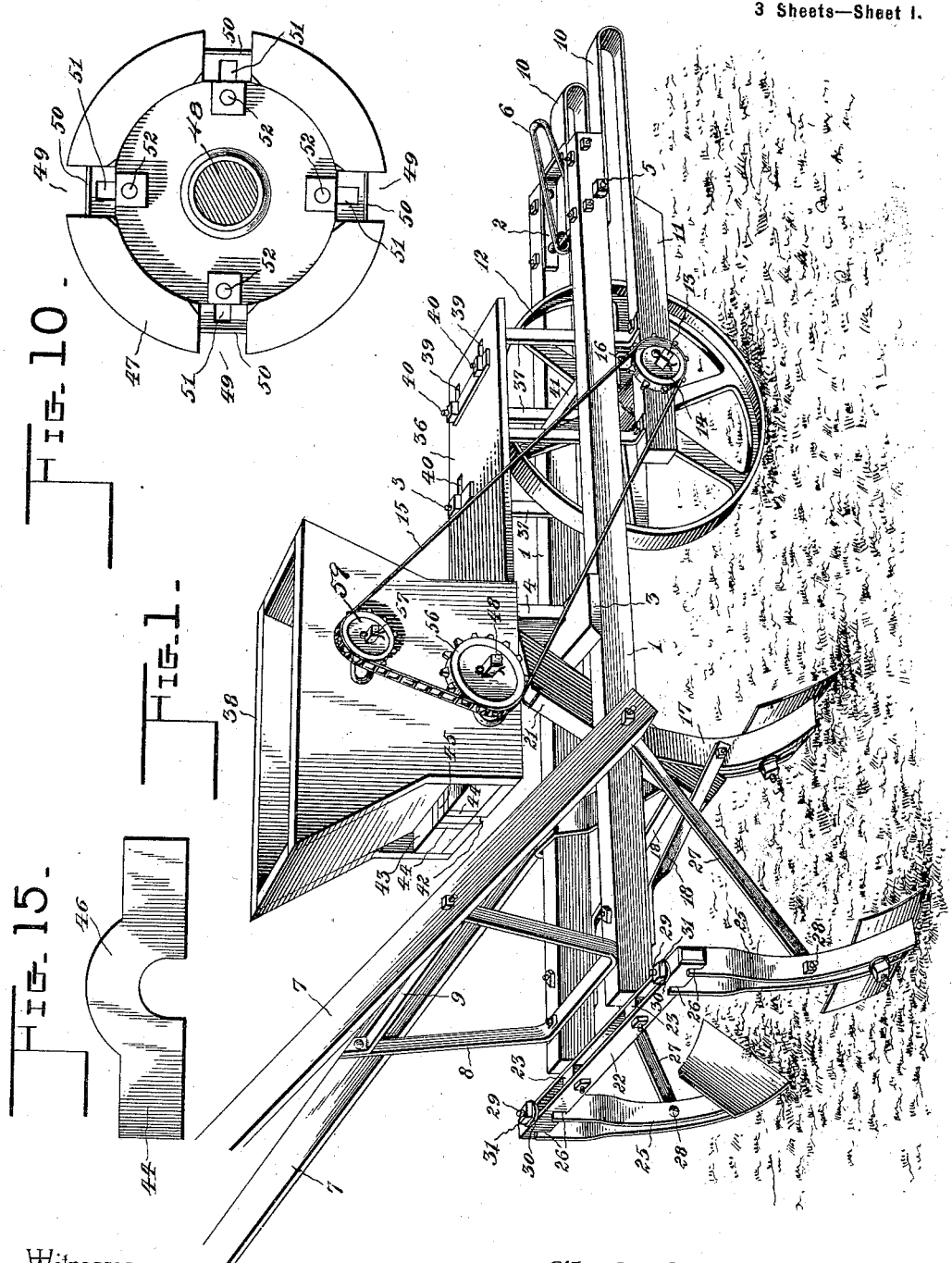
Witnesses
John F. [signature]
V. B. Hillyard.
Charles R. Reid, Inventor
By his Attorneys,
C. A. Snow & Co.
THE NORRIS PETERS CO., PHOTO-LITHO., WASHINGTON, D. C.

No. 612,460. Patented Oct. 18, 1898.
C. R. REID.
COMBINED CULTIVATOR, PLANTER, AND FERTILIZER DISTRIBUTER.
(Application filed May 26, 1898.)
(No Model.) 3 Sheets—Sheet 2.
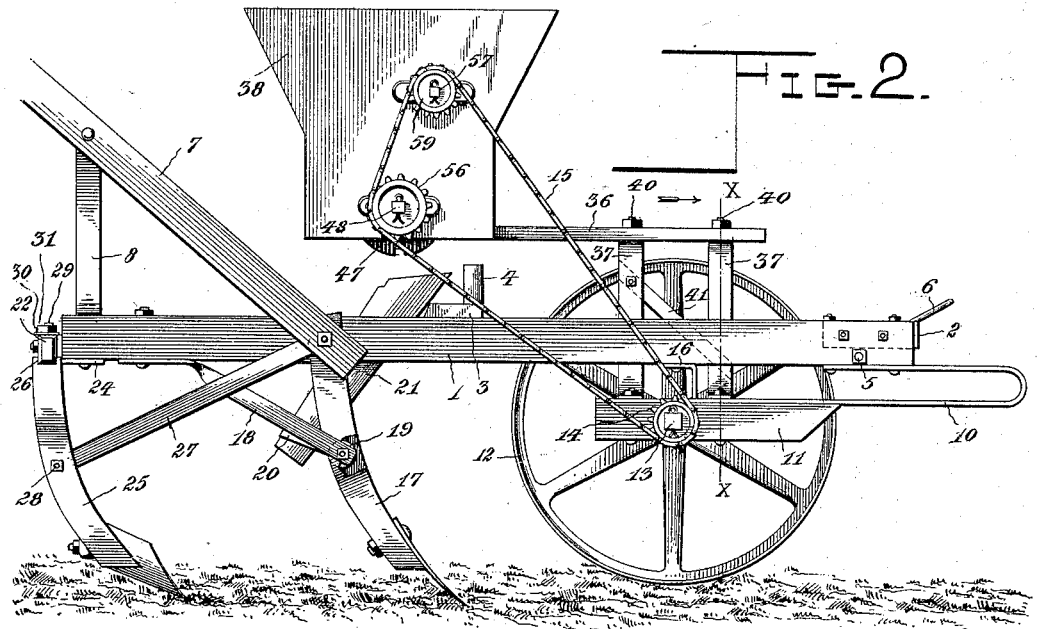
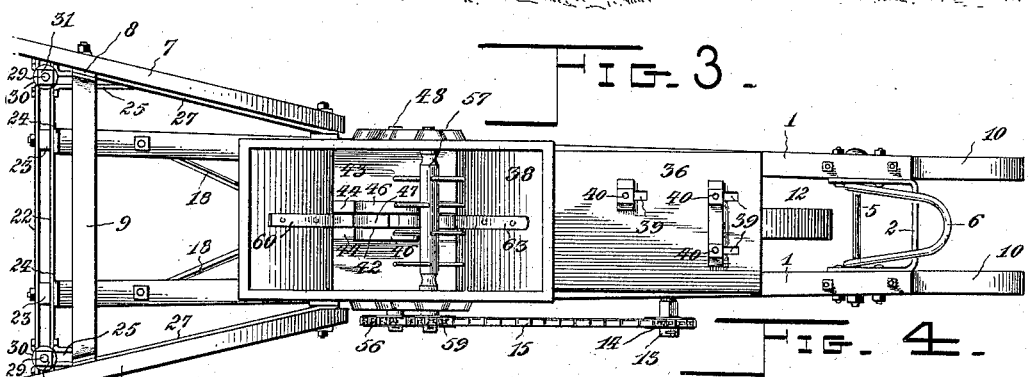
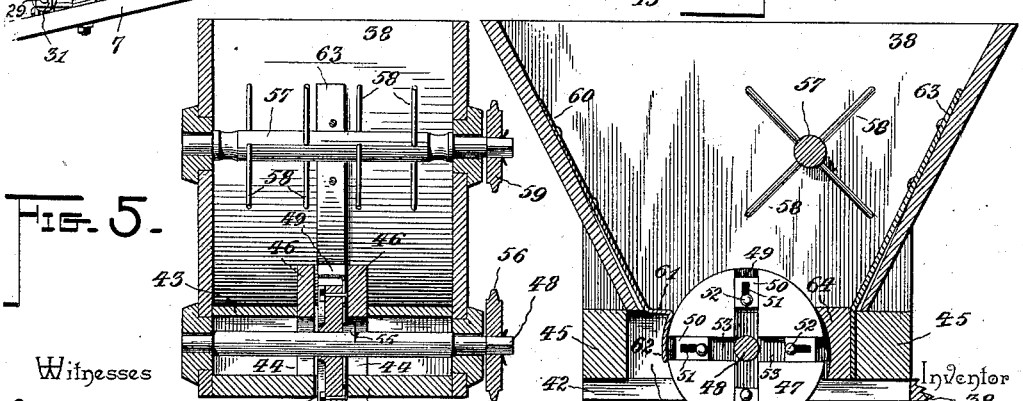
Witnesses
John F. Seuferwick
U. B. Hillyard.
Inventor
Charles R. Reid.
By his Attorneys,
C. A. Snow & Co.
THE NORRIS PETERS CO., PHOTO-LITHO., WASHINGTON, D. C.

No. 612,460. Patented Oct. 18, 1898.
C. R. REID.
COMBINED CULTIVATOR, PLANTER, AND FERTILIZER DISTRIBUTER.
(Application filed May 26, 1898.)
(No Model.) 3 Sheets—Sheet 3.
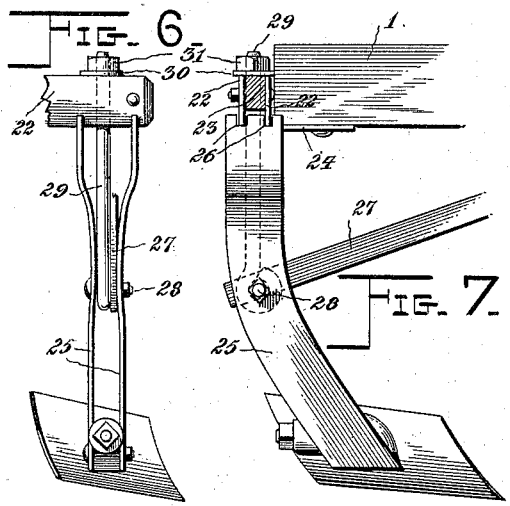
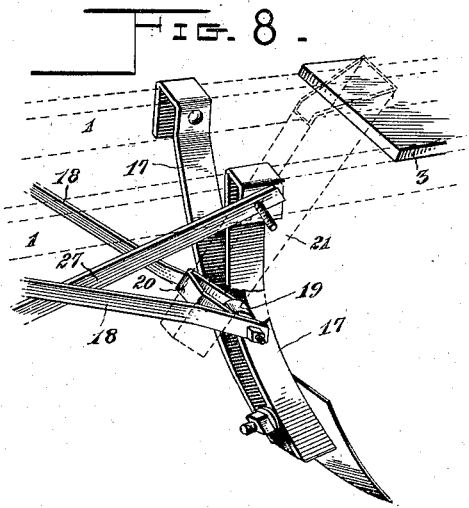
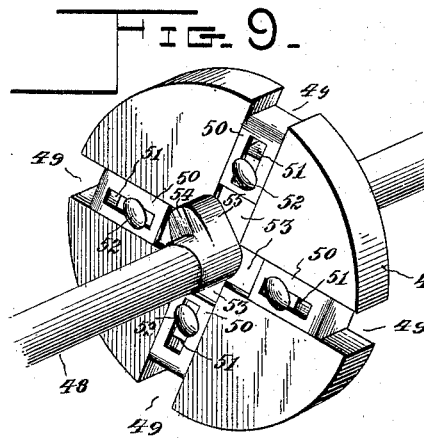
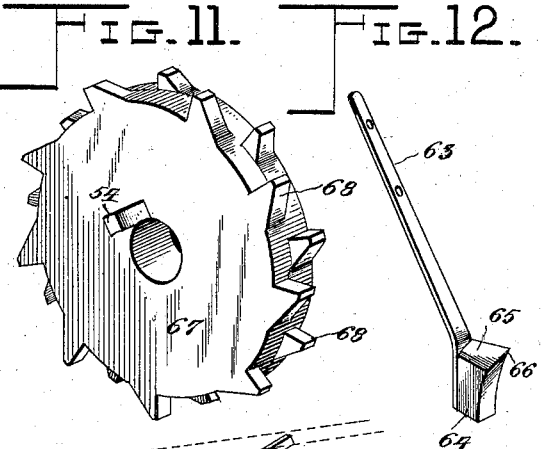
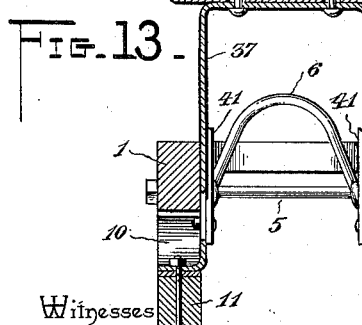
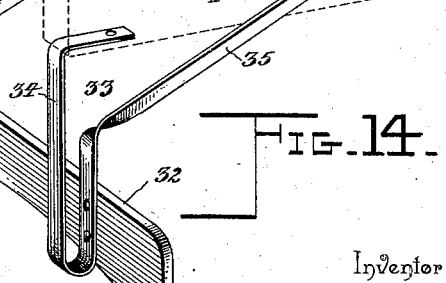
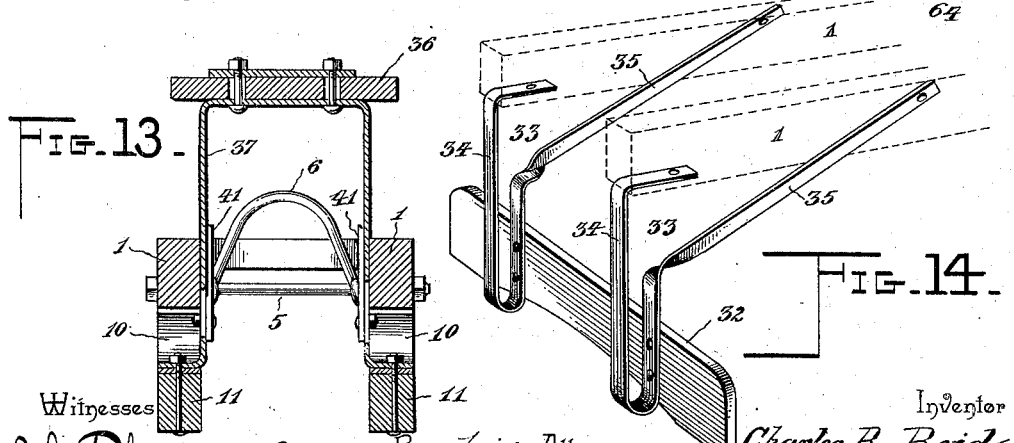
Witnesses
John F. Deufferwiel
V. B. Hillyard
By his Attorneys,
C. A. Snow & Co.
Inventor
Charles R. Reid,

UNITED STATES PATENT OFFICE.

CHARLES RUFUS REID, OF HEIDELBERG, MISSISSIPPI.

COMBINED CULTIVATOR, PLANTER, AND FERTILIZER-DISTRIBUTER.

SPECIFICATION forming part of Letters Patent No. 612,460, dated October 18, 1898.

Application filed May 26, 1898. Serial No. 681,818. (No model.)

*To all whom it may concern:*

Be it known that I, CHARLES RUFUS REID, a citizen of the United States, residing at Heidelberg, in the county of Jasper and State of Mississippi, have invented a new and useful Combined Cultivator, Planter, and Fertilizer-Distributer, of which the following is a specification.

This invention is designed to provide an agricultural implement which can be used for cultivating, sowing seed of the different varieties, and distributing fertilizer, and which will involve a compact arrangement, be positive in action when distributing seed or fertilizer, and be adjustable to allow for the quick substitution of different dropping-wheels, according to the nature of the seed to be planted or the fertilizer to be dropped.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a combined cultivator, planter, and fertilizer-distributer embodying the principal features of this invention. Fig. 2 is a side elevation. Fig. 3 is a plan view. Fig. 4 is a longitudinal section of the hopper. Fig. 5 is a transverse section thereof. Fig. 6 is a rear view of a coverer. Fig. 7 is a detail view in elevation of the coverer, showing the means for adjustably connecting it with the transverse bar and the latter with the frame. Fig. 8 is a detail view of the opener, showing the relation of the braces and grain-spout yoke and indicating the spout by dotted lines. Fig. 9 is a detail view of the wheel for dropping seed or fertilizer. Fig. 10 is a detail view of the dropping-wheel as seen from the opposite side. Fig. 11 is a detail view in perspective of a dropping-wheel for distributing fertilizer and cotton-seed. Fig. 12 is a detail view of the cut-off for preventing the cups or pockets of the dropping-wheel from carrying more than a definite amount of grain or fertilizer to the spout. Fig. 13 is a transverse section of the front portion of the planter on the line X X of Fig. 2, looking to the front. Fig. 14 is a perspective view of the drag to be substituted for the covering shovels or blades when the seed is planted comparatively shallow. Fig. 15 is a side elevation of one of the bars arranged alongside of the dropping-wheel.

Corresponding and like parts are referred to in the following description and indicated in the several views of the drawings by the same reference characters.

The main frame comprises longitudinal bars 1, which are connected at their front ends by means of a substantially U-shaped iron 2, having its parallel or bent end portions bolted to the sides of the bars 1. A plate 3 is secured to the top side of the bars 1 at an intermediate point and has a block 4 applied to its upper side and constituting a bolster to support the weight of the hopper when the latter is weighted by being supplied with grain or fertilizer. A transverse pin 5 has its ends let into the forward parts of the bars 1 and supports a clevis 6 of common construction. The front end of the clevis preferably rests upon the transverse portion of the iron or U-shaped strap 2; but it is obvious that it may be arranged so as to come below the said iron. The handles 7 are bolted to the sides of the bars 1 and are supported by a brace 8, which is secured to the rear ends of the bars 1, and consists of an iron strap having its end portions bent vertically and made fast to the sides of the handles. A bar 9, consisting of a stout iron strap, has its end portions bent about at right angles and secured to the handles by the same bolts or fastenings connecting the brace 8 therewith. This construction is of advantage, inasmuch as it admits of the lower ends of the handles being separated and brought together when making changes which hereinafter will be referred to.

Springs 10, consisting of bars of spring metal having their end portions folded or bent back upon themselves, are connected to the forward ends of the bars 1 and have their folded end portions projecting in front of the bars 1 and receive bearings 11, which are applied to the lower sides of the rear end portions of the lower members of said springs. The ground-wheel 12 has its axle 13 journaled in the bearings 11, and besides supporting the front end of the implement is the means for actuating the agitator and the shaft carrying the dropping-wheel. A sprocket-wheel 14 is secured to a projecting end of the axle 13 and imparts motion to the sprocket-chain 15, by means of which the movement imparted thereto is transmitted to the seeding or fertilizer-distributing mechanism. The bearings 11 are sufficiently long to stiffen and brace the rear ends of the lower members of the springs 10. Stops 16 in the form of angle-irons are secured to the lower sides of the bars 1 and are adapted to limit the upward movement of the rear ends of the lower members of the springs 10 by coming in contact therewith.

The opener consists of a standard 17, provided at its lower end with a shovel-point of any pattern, according to the work to be performed. The standard 17 is composed of two parts or members secured together and spaced apart. The upper ends of the members are bent to extend over the bars 1 and down upon the outer sides thereof, thereby embracing said bars upon three sides, whereby a firm connection is had. Braces 18 have connection at their lower ends with the standard 17 and at their upper rear ends with the bars 1 and fix the position of said standard against rearward and lateral movement. A collar 19 is placed between the members of the standard 17 and is received upon the bolt connecting the braces 18 and the parts of the standard together. A yoke 20, consisting of an iron strap bent into an approximately U form, is secured to the standard by having its free end portions mounted upon the bolt connecting the parts 17 and 18 and coming between said parts. The grain-spout 21 has its lower end slipped into the yoke 20 and its upper end resting against the plate 3, to which it is secured. The grain-spout inclines downwardly and rearwardly from its upper or receiving end, thereby enabling the hopper to be located about centrally of the frame.

A transverse bar 22 is located at the rear of the frame and is secured to the rear terminals of the bars 1 and is composed of parallel strips or members held apart the required distance by means of interposed spacing-blocks 23. The bolts or fastenings connecting the members comprising the bar 22 also serve to secure the spacing-blocks 23 in place. Angle-irons 24 have their horizontal portions secured against the bottom side of the bars 1 by the same bolts which connect the brace 8 thereto, and their vertical portions come against the rear ends of the bars 1 and are secured to the members of the part 22 by the same bolts or fastenings which connect the strips of the bar 22 and the intermediate spacing-blocks. The standards 25 of the coverers are secured to the bar 22 in such a manner as to admit of their being brought closer together or separated, as required. Each standard is provided at its lower end with a shovel or blade of any desired construction and is composed of companion members which are spaced apart and secured together. The upper ends of the members of each standard 25 are spread slightly and are depressed or formed with notches 26 to receive the lower edges of the strips comprising the bar 22, so as to fix the position of the standard when its fastenings have been properly tightened. Braces 27 connect the standards 25 with the bars 1, and the upper forward ends of the braces are slipped upon the bolts which connect the handles 7 and standard 17 to the side frame-bars. A pin or bolt 28 connects the rear end of each brace 27 with the members of a standard, and an eyebolt 29 receives the pin or bolt, which passes therethrough. Each standard 25 is provided with an eyebolt 29, which is located between the upper end portions of its members, and the upper end portion of the eyebolts passes between the strips of the bar 22 and is threaded and receives a washer 30 and a nut 31, the latter serving to draw the standard upward and against the lower side of the bar 22 with sufficient force to prevent slipping thereof. Upon loosening the nuts 31 the standards 25 can be moved along the bar 22, so as to vary the distance between them, and when positioned the standards are held fast by retightening the nuts 31, previously loosened.

In some instances the coverers 25 will be replaced by a drag, the latter consisting of a bar or plate 32 and draft attachments 33 for connecting the drag with the bars 1. The draft attachments 33 are strips of iron doubled upon themselves, forming rear uprights 34 and forwardly-inclined braces 35, the latter being adapted to be secured to the bars 1 by the bolts or fastenings connecting the handles 7 and the standard 17 therewith. The rear upright portions 34 have their upper ends bent so as to come beneath the bars 1 and be secured thereto by the bolts or fastenings connecting the brace 8 therewith. To substitute the drag for the coverers, the bolts connecting the handles and the brace 8 with the bars 1 are loosened, and the lower ends of the handles 7 are sprung outward to admit of the braces 27 being disconnected from the bolts and the brace portions 35 engaged with said bolts, after which the handles are replaced and the bolts previously loosened tightened. After the angle-irons 24 have been detached from the bolts connecting the brace 8 with the bars 1 the bent ends of the rear uprights 34 of the parts 33 are engaged with said bolts and the latter retightened, thereby completing the connections between the drag and the frame.

A platform 36 has adjustable connection with arched bars 37, secured to the rear ends of the lower parts of the spring 10, and supports the hopper 38. Longitudinal slots 39 are formed in the front portion of the platform 36 and receive the bolts 40, by means of which the arched bars 37 have relative adjustable connection with the platform. By having the platform adjustably connected with the arched bars the hopper can be moved forward or rearward in order to secure the proper tension upon the sprocket-chain 15. The lower ends of the arched bars 37 are bent outwardly and rest upon the lower members of the springs 10, and are secured thereto by the same bolts or fastenings employed for attaching the bearings 11 thereto. Upwardly and rearwardly inclined braces 41 connect corresponding side members of the arched bars 37 and strengthen and fix their position. The rear end of the platform is formed with a slot 42, through which operates the dropping-wheel, by means of which the seed or fertilizer is distributed. The hopper is secured to the platform and its front and rear walls are upwardly divergent. The seed or fertilizer is supported upon a false bottom 43, which is elevated a short distance from the platform, so as to form a space between the two. The false bottom has a longitudinal slot or opening in which is fitted parallel bars 44, spaced apart a distance corresponding to the width of the slot 42 and the thickness of the dropping-wheels, which latter fit snugly between the bars 44. Blocks 45 are secured between the end portions of the bars 44 to maintain the latter at a fixed distance apart, so as to prevent binding of the dropping-wheels. Upwardly-curved extensions 46 are formed with or applied to the bars 44 at an intermediate point and correspond with the circumference of the dropping-wheel having the pockets, so as to come about flush with its periphery.

The dropping-wheel 47 is mounted upon a shaft 48 and is provided at intervals in its periphery with notches or depressions 49, forming cups or pockets to receive seed and fertilizer. These notches or depressions 49 extend through the sides of the wheel and are closed at their open sides by the inner walls of the bars 44. The notches are cut square across the wheel, thereby forming angular or square pockets, which form is found to give the best results, especially when planting corn, which is of oblong form and of a shape best adapted to enter a square or rectangular pocket. The capacity of the pockets is adapted to be regulated, so that any required amount of grain or fertilizer can be deposited in a hill. Angle-plates 50 have their horizontal portions corresponding to the length and width of the notches 49 and forming bottoms therefor which are adjustable in and out to vary the depth, and consequently the capacity, of the pockets. The vertical members of the angle-plates have longitudinal slots 51, in which operate bolts 52, by means of which the angle-plates are secured in an adjusted position. Radial channels 53 are formed in one side of the wheel 47 to receive the vertical members of the angle-plates, thereby admitting of them coming flush with the side of the wheel, which is of advantage in enabling the horizontal portion of the angle-plates filling the length and breadth of the notches without necessitating the deflecting or bending of the vertical portions of the said angle-plates. The opposite side of the wheel 47 to that having the channels 53 is depressed, so as to receive the nuts of the bolts 52, whereby said nuts are prevented from projecting beyond the plane of the sides of the wheel against which they bear and are thereby out of the way of the proximal bar 44. A lug 54 is formed with or applied to a side of the wheel 47 and is adapted to enter the space formed between a pair of lugs 55, applied to the shaft 48, so as to cause the shaft and dropping-wheel to rotate as one part. The dropping-wheel is removably mounted upon the shaft 48, so as to admit of it being substituted by a dropping-wheel of different construction, according to the nature of the seed or fertilizer to be distributed. By a proper adjustment of the angle-plates 50 the seed or fertilizer can be dropped at any required distance apart, inasmuch as one or more of the pockets may be brought into active operation.

The shaft 48 is journaled in bearings secured to the sides of the hopper, one of the bearings being detachable, so as to admit of an endwise movement of the shaft to withdraw it from engagement with the dropping-wheel when it is required to substitute another of different form therefor. An end portion of the shaft 48 projects and receives a sprocket-wheel 56, with which the sprocket-chain 15 engages, whereby motion is imparted to the dropping-wheel when the planter is in operation. The end portions of the shaft 48 are reduced, forming shoulders which engage with the inner ends of the bearings, so as to prevent endwise movement of the shaft after the parts have been properly assembled and made fast. The opening in the side of the hopper through which the shaft 48 is withdrawn and inserted is sufficiently large for the passage of the shaft and the lugs 55.

The agitator for stirring the seed and fertilizer consists of a shaft 57, journaled at its ends in bearings applied to the sides of the hopper, and has radially-disposed pins 58, said pins being set at different relative angles, so as to insure an agitation of the grain and fertilizer, whereby it is loosened and prevented from banking in the hopper. While the pins 58 may be applied to the shaft in any desired manner, it is preferred to cast them therewith, thereby obviating the formation of joints and the necessity for providing securing means. The shaft 57 projects beyond a side of the hopper and receives a sprocket-wheel 59, around which passes the upper end portion of the sprocket-chain 15. The spaces in the front and the rear of the dropping-wheel are closed by cut-offs, the rear cut-off consisting of a strip of spring metal 60, secured at its upper end to the rear wall of the hopper and having its lower end portion bent forwardly, as shown at 61, forming an abutment, and having its lower portion curved, as shown at 62, to fit against the peripheral portion of the wheel 47 and spanning the pocket thereof, so as to prevent the abutment 61 engaging with a wall of the pockets when the wheel is rotating. The front cut-off consists of a spring 63, secured to the front wall of the hopper and having its lower end bent, and a block 64, secured to the lower bent end of the spring 63. This block 64 has its upper portion extended toward the wheel 47 and its upper end beveled or inclined to one side, as shown at 65, whereby the grain or fertilizer will be pushed to one side of the wheel, so as to prevent injury to the grain. By having the upper end of the block beveled or inclined to one side and its upper portion extended toward the wheel 47 a projecting portion 66 is provided and is located in a plane corresponding to one side of the wheel 47, and this projection 66 comes in contact with the grain first and starts the grain projecting beyond the pockets of the wheel 47 laterally, thereby striking the pockets, so that each hill will receive a like amount of grain.

The dropping-wheel 67 for commercial fertilizer and cotton-seed is formed around its periphery with two sets of teeth 68, the teeth of one set coming opposite the spaces formed between the teeth of the other set, whereby the wheel is practically continuous in operation and is eminently satisfactory in result. This wheel corresponds in diameter with the wheel 47; but the teeth 68 project, so as to operate beyond the plane of the curved extensions 46 of the bars 44, so as to engage positively with the fertilizer and cotton-seed and insure a distribution thereof. When the wheel 67 is substituted for the dropping-wheel 47, the cut-offs 60 and 63 must be elevated, so as to clear the teeth 68, as will be readily understood. When the implement is to be used solely as a cultivator, the planting attachment can be easily removed by disconnecting the springs 10 from the bars 1 or removing the arched bars 37 from said springs if it be required to retain the ground-wheel.

It will be understood from the foregoing description that the axle for the ground-wheel is carried by bearings which are attached by springs to the main carrying-frame formed by the bars 1 and that the hopper is carried by a platform connected rigidly by the arched supports 37 to the bearing-blocks 11. The hopper is designed to occupy the same relative position to the main frame when loaded or empty, because the springs 10 are of sufficient tension to raise the hopper above the supporting-block 4; but when the main frame is raised at its front end the block 4 supports the hopper, so as to make it remain in its normal position. The block 4 is for the purpose of keeping the ground-wheel 12 on the ground, and the tension of the springs is sufficient to hold the free rear ends thereof upward against the stop-pieces 16 unless the front end of the main frame is raised by the shaft or the ground-wheel 12 enters a depression in the ground. In practice I prefer to incline the lower free ends of the springs 10 in order to give the necessary tension to the springs required to hold the hopper upward away from the supporting-block 4 even when the hopper is loaded with seed or fertilizer, and thus insure a space between the block and hopper in order to prevent the wheel 12 from lifting off the ground and failing to operate the dropper devices when the frame 1 is raised. The stops 16 rest upon the springs 10 over the bearings 11, so that the plow-shovels may be adjusted to run in the soil any depth that may be necessary or desirable, and the adjustment is effected by loosening the nuts which fasten the standards 17 25, thus permitting the parts to be raised or adjusted, after which the nuts should again be tightened.

The sprocket-wheels 14, 56, and 59 are of different diameters, and they may be used interchangeably on the axle, the dropping-shaft, and the agitator-shaft, so that the different sizes of the sprockets may be employed on the dropping-shaft 48 to drive the latter at different speeds, and thus place within the discretion of the operator a means by which the corn may be planted at different distances apart as well as by adjusting the slides in the pockets of the dropping-disk. It will be evident that by employing a large sprocket on the dropping-shaft it will rotate slower than when a small sprocket is attached to the dropping-shaft.

In using the machine to distribute fertilizer and cultivate the crop the right-hand plow-standard 25 should be detached, and in lieu thereof any kind of plow blade or shovel may be used to run around the corn or cotton and distribute the fertilizer, which is dropped in the furrow opened by the shovel on the standard 17, the furrow being covered by the left-hand shovel on the standard 25.

Having thus described the invention, what is claimed as new, and desired to be secured by Letters Patent, is—

1. In a planter, the combination with the main frame provided with the furrow opening and closing devices, of a ground-wheel, a seeding mechanism supported by means of the ground-wheel independently of the main frame, a stop located forward of the seeding mechanism and interposed between the main frame and the mountings of the ground-wheel to limit the upward movement of the latter, and forming means for said mountings to tilt upon to admit of the seeding mechanism moving vertically and a spring connection between the main frame and the mountings of the ground-wheel, substantially as set forth.

2. In an implement for distributing grain or fertilizer, the combination with the main frame provided with furrow opening and closing devices, of a ground-wheel, a distributing mechanism mounted upon the ground-wheel independently of the main frame, a spring connection between the main frame and the mountings of the ground-wheel, and means placed between the seeding mechanism and main frame for limiting the downward movement of the aforesaid distributing mechanism and ground-wheel, substantially as set forth.

3. In an implement for distributing grain and fertilizer, the combination with the main frame provided with furrow opening and closing devices, of a ground-wheel mounted to move vertically with reference to the main frame, a distributing mechanism supported by means of the ground-wheel independently of the main frame and actuated from said ground-wheel, means for limiting the upward movement of the ground-wheel and adapted to have its mountings tilt thereon, means between the distributing mechanism and the main frame for limiting the vertical movements of the seeding mechanism due either to the tilting or vertical play of the ground-wheel bearings, and a spring connection between the main frame and the mountings of the ground-wheel, substantially as set forth.

4. In an implement for distributing grain and fertilizer, the combination with the main frame provided with furrow opening and closing devices, of a ground-wheel located in advance of the earth-treating devices, a platform supported at its front end by the ground-wheel independently of the main frame, a spring connection between the main frame and the mountings of the ground-wheel, a distributing mechanism mounted upon the rear end of the said platform and actuated from the ground-wheel, a stop between the ground-wheel mountings and the main frame, and a bolster between the main frame and the rear end portion of the platform, substantially as and for the purpose set forth.

5. In an implement for distributing grain and fertilizer, the combination with the main frame provided with furrow opening and closing devices, of a ground-wheel mounted to move vertically with respect to the main frame, means for limiting the vertical movements of the ground-wheel, a platform having its forward end adjustably connected with the ground-wheel mountings, a seeding mechanism supported by means of the platform, and means for transmitting motion from the ground-wheel to the seeding mechanism, substantially as set forth.

6. In an implement for distributing grain and fertilizer, the combination with the main frame, a ground-wheel and a spring connection between the mountings of the ground-wheel and the main frame, of a stop interposed between the ground-wheel mountings and the main frame to limit the vertical movements of the ground-wheel and admit of its mountings tilting thereon, arched bars applied to the ground-wheel mountings and having their side members engaging with the longitudinal bars of the main frame, a platform having adjustable connection with the arched bars and supporting a seeding mechanism, means for transmitting motion from the ground-wheel to the seeding mechanism, and a stop interposed between the platform and main frame to limit the vertical movements of the seeding mechanism whether due to the vertical play of the ground-wheel or the tilting of the ground-wheel mountings, substantially as set forth.

7. The combination with the main frame, and a ground-wheel mounted to move vertically with respect to the main frame, of arched bars secured to the mountings of the ground-wheel and having their vertical or side members in contact with bars of the main frame, a platform having adjustable connection at its front end with the arched bars and supporting the distributing mechanism at its rear end, and means for transmitting motion from the ground-wheel to the distributing mechanism, substantially as set forth.

8. In combination, side pieces spaced apart, and a dropping-wheel having notches or recesses in its periphery cut square across and extending through the sides of the wheel and closed at their ends by the aforesaid side pieces, substantially as set forth.

9. In combination, a dropping-wheel having notches or depressions in its periphery cut square across and extending through the sides of the wheel, and side pieces closing the ends of said notches or recesses and having curved extensions corresponding with the wheel, substantially as set forth.

10. In combination, parallel bars, spacing-blocks secured between the end portions of the bars, and a dropping-wheel having notches or recesses in its periphery cut square across and opening through the sides of the wheel and closed at their ends by the inner walls of the bars, substantially as set forth.

11. In combination, a dropping-wheel having notches or recesses in its periphery, angle-plates having their horizontal portions forming bottoms for the pockets or depressions, and means for adjustably connecting the angle-plates with the wheel, substantially as set forth.

12. In combination, a dropping-wheel having notches or recesses in its periphery, and radial channels in one side in line with the recesses, angle-plates having their vertical members slotted and fitted into the said channels and having their horizontal portions forming bottoms for the recesses, and fastenings operating in the slotted members of the angle-plates for securing them in an adjusted position, substantially as described.

13. In combination, a hopper having a false bottom arranged a distance above the bottom proper, and having vertically-alined openings in the main and false bottoms, a dropping-wheel removably fitted in said openings from below and having a lateral extension contiguous to the opening through which the shaft passes, a shaft having an endwise movement through an opening in the side of the hopper opposite the space between the main and false bottoms and through the opening of the dropping-wheel and having a pair of spaced lugs to receive between them the lateral extension of the dropping-wheel, said shaft operating in the space between the main and false bottoms, and a bearing closing the opening in the side of the hopper through which the shaft is endwise movable and acting jointly with a corresponding bearing at the opposite side of the hopper to support the shaft and prevent endwise play thereof when in operation, substantially as set forth.

14. In an implement for distributing seed and fertilizer, the combination with the hopper, and a dropping-wheel, of cut-offs for closing the spaces in the front and in the rear of the dropping-wheel, the same consisting of springs attached to the front and rear walls of the hopper, and having inner extensions at their lower ends forming shoulders in the plane of the upper surface of the hopper-bottom, and having the parts below said shoulders constructed to bear against the dropping-wheel, substantially as set forth.

15. The combination with the hopper and the dropping-wheel, of a cut-off consisting of a spring secured to a wall of the hopper and having its lower portion bent inward forming an abutment, thence curving downwardly to engage with the dropping-wheel, substantially as described.

16. The combination with the hopper and the dropping-wheel, of a cut-off having its upper end beveled or inclined from one side of the plane of the dropping-wheel to the other side, substantially as set forth.

17. The combination with the hopper and the dropping-wheel, of a cut-off having an extension at one side which inclines away from and toward the opposite side of the dropping-wheel, substantially as described.

18. The combination with a transverse bar comprising parallel members spaced apart, of a standard comprising side members notched in their upper ends to receive the lower edge portion of the bar, and a bolt passing between the upper end portions of the members of the standard and between the parts of the bar to secure the standard in an adjusted position, substantially as described.

19. The combination with side bars, of a standard composed of companion parts having their upper ends bent to embrace three sides of the aforesaid bars, fastenings for connecting the members of the standard to said bars, and braces extending rearwardly from the standard, substantially as set forth.

20. In combination, side bars, a standard composed of companion members having their upper ends bent to embrace three sides of the bars, braces, a yoke for receiving the grain-spout, a spacing-collar, and a bolt connecting the braces, yoke, collar and members of the standard together, substantially as set forth.

In testimony that I claim the foregoing as my own I have hereto affixed my signature in the presence of two witnesses.

CHARLES RUFUS REID.

Witnesses:
   STONE DEAROUSS,
   T. H. AINSWORTH.